(12) United States Patent
Törmä

(10) Patent No.: US 12,212,703 B2
(45) Date of Patent: Jan. 28, 2025

(54) DETERMINING A STATUS OF A MOBILE ELECTRONIC DEVICE

(71) Applicant: BLANCCO TECHNOLOGY GROUP IP OY, Joensuu (FI)

(72) Inventor: Markus Törmä, Joensuu (FI)

(73) Assignee: BLANCCO TECHNOLOGY GROUP IP OY, Joensuu (FI)

(*) Notice: Subject to any disclaimer, the term of this patent is extended or adjusted under 35 U.S.C. 154(b) by 306 days.

(21) Appl. No.: 17/763,487

(22) PCT Filed: Sep. 14, 2020

(86) PCT No.: PCT/EP2020/075635
§ 371 (c)(1),
(2) Date: Mar. 24, 2022

(87) PCT Pub. No.: WO2021/058310
PCT Pub. Date: Apr. 1, 2021

(65) Prior Publication Data
US 2022/0377165 A1    Nov. 24, 2022

(30) Foreign Application Priority Data
Sep. 24, 2019 (GB) ..................... 1913773

(51) Int. Cl.
*H04M 1/24* (2006.01)
*G06F 11/30* (2006.01)

(52) U.S. Cl.
CPC .......... *H04M 1/24* (2013.01); *G06F 11/3013* (2013.01); *G06F 11/3055* (2013.01)

(58) Field of Classification Search
None
See application file for complete search history.

(56) References Cited

U.S. PATENT DOCUMENTS 10,560,824 B1 * 2/2020 Kerr .................. H04W 4/12
2012/0047439 A1 * 2/2012 Harlan ............... G06F 11/3055
709/224

(Continued)

FOREIGN PATENT DOCUMENTS

CN       108763020      11/2018
EP         3367645       8/2018

OTHER PUBLICATIONS

Steve Heath, Embedded Systems Design, 2003, ISBN: 0 7506 5543 1, pp. 351-352 (4 pages total).

(Continued)

*Primary Examiner* — Adolf Dsouza
(74) *Attorney, Agent, or Firm* — DICKINSON WRIGHT PLLC

(57) ABSTRACT

A method for use in determining a status of a mobile electronic device, comprises repeatedly reading information from a debug log stored in a ringbuffer of the mobile electronic device, repeatedly using the information read from the debug log to construct and maintain an event history for the mobile electronic device, and repeatedly determining the status of the mobile electronic device based on the event history. The method may be used for determining a status of a mobile electronic device and, in particular though not exclusively, for use in determining a status of one or more hardware elements of a mobile phone, a smartphone, a tablet and/or a laptop. A system and a computer program for use in determining a status of a mobile electronic device are also disclosed.

25 Claims, 5 Drawing Sheets

(56) References Cited

U.S. PATENT DOCUMENTS

| | | | |
|---|---|---|---|
| 2015/0074052 A1* | 3/2015 | Srinivasan | G06F 16/27 |
| | | | 707/634 |
| 2015/0215472 A1 | 7/2015 | Kandregula | |
| 2018/0268783 A1 | 9/2018 | Woo | |
| 2018/0359244 A1* | 12/2018 | Cockerill | H04L 63/12 |
| 2020/0245134 A1* | 7/2020 | Kaczynski | H04L 51/04 |

OTHER PUBLICATIONS

UK Search Report dated Jul. 14, 2020 (Jul. 14, 2020) issued on related application GB1913773.6 by the United Kingdom Patent Office.
Notice of Reasons for Refusal / Japanese Office Action dated Oct. 25, 2024 (Oct. 25, 2024), 6 pages, issued on related Japanese Patent Application JP 2022-518974, by the Japanese Patent Office.

* cited by examiner

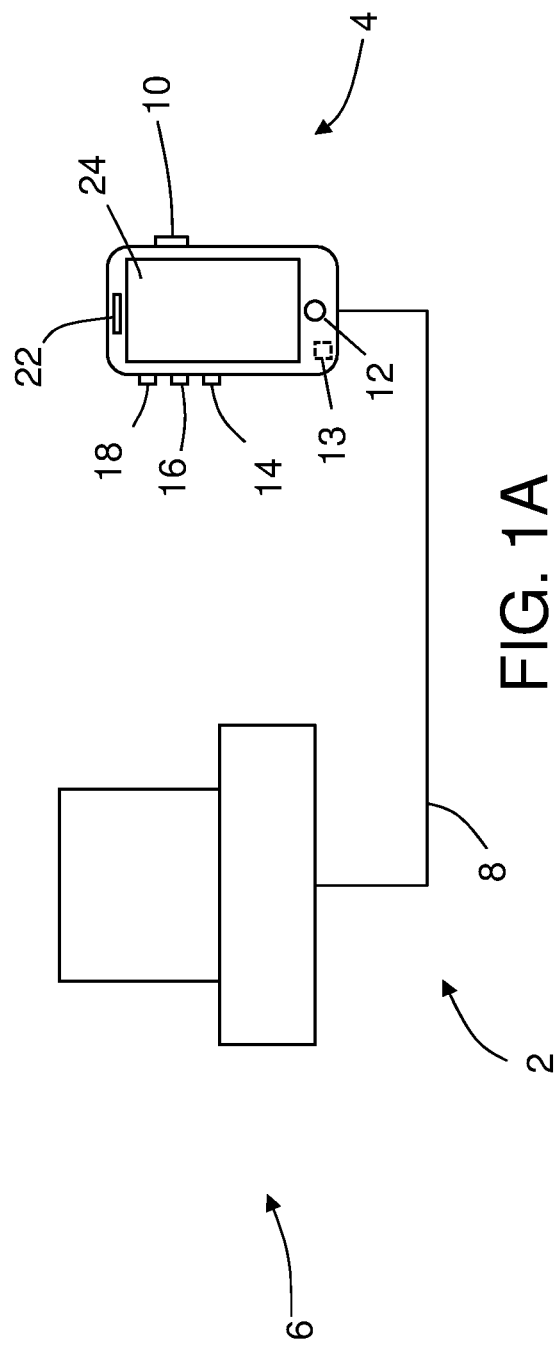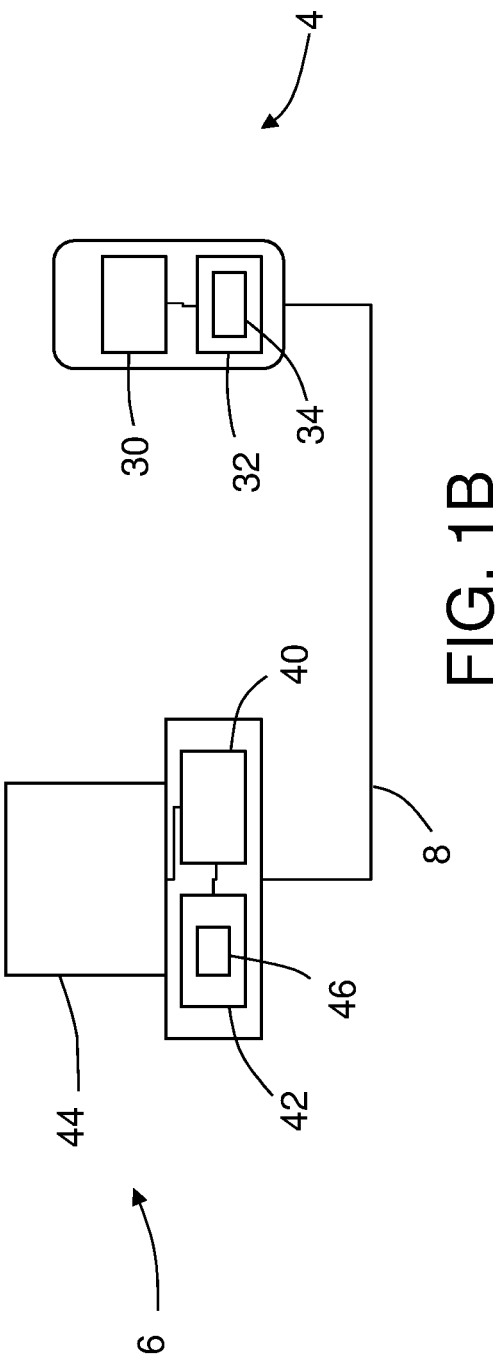

DETERMINING A STATUS OF A MOBILE ELECTRONIC DEVICE

CROSS REFERENCE TO RELATED APPLICATIONS

This application is a U.S. National Phase patent application of and claims priority to PCT/EP2020/075635, filed Sep. 14, 2020, which claims priority to and the benefit of United Kingdom patent application 1913773.6 filed Sep. 24, 2019, each of the foregoing applications being incorporated herein by reference.

FIELD

The present disclosure relates to a system, method, and computer program for use in determining a status of a mobile electronic device and, in particular though not exclusively, for use in determining a status of one or more hardware elements of a mobile phone, a smartphone, a tablet and/or a laptop.

BACKGROUND

It is known to install a diagnostic application on a mobile electronic device which, when executed by a processor of the mobile electronic device, may be used to verify whether the mobile electronic device is operating in an expected or desired manner. Such diagnostic applications may receive information indirectly from the OS of the mobile electronic device via the application programming interfaces (APIs) of the OS, which information relates to at least one of the status, the activation and/or the operation of one or more hardware inputs of the mobile electronic device. For example, such diagnostic applications may receive information indirectly from the OS of the mobile electronic device via APIs of the OS, which information relates to at least one of the status, the activation and/or the operation of one or more controls, one or more push buttons, a touchscreen, one or more sensors and the like of the mobile electronic device.

However, in some circumstances, it may not be technically possible to install and/or execute a diagnostic application on a mobile electronic device e.g. as a consequence of lack of memory available on the mobile electronic device. Additionally or alternatively, the installation and/or execution of a third-party diagnostic application on a mobile electronic device may be prohibited by a manufacturer of the mobile electronic device and/or a manufacturer of the OS of the mobile electronic device. Also, in some circumstances, the mobile electronic device may have one or more broken controls, one or more broken push buttons, a broken touchscreen, and/or one or more broken sensors which may prevent a user of the mobile electronic device from navigating to, or executing, a diagnostic application and/or which may prevent a user of the mobile electronic device from inputting and/or receiving instructions from the mobile electronic device.

SUMMARY

According to an aspect of the present disclosure there is provided a method for use in determining a status of a mobile electronic device, the method comprising:
repeatedly reading information from a debug log stored in a ringbuffer of the mobile electronic device;
repeatedly using the information read from the debug log to construct and maintain an event history for the mobile electronic device; and
repeatedly determining the status of the mobile electronic device based on the event history.

Such a method for use in determining the status of a mobile electronic device does not require the installation and/or execution of a diagnostic application on the mobile electronic device and can therefore be used even when it is not technically possible to install and/or execute a diagnostic application on the mobile electronic device e.g. as a consequence of lack of memory available on the mobile electronic device. Such a method for use in determining the status of the mobile electronic device may avoid any requirement to receive information indirectly from the OS of the mobile electronic device via the APIs of the OS. Additionally or alternatively, such a method for use in determining the status of the mobile electronic device may avoid any restrictions imposed by the manufacturer of the mobile electronic device and/or a manufacturer of an OS of the mobile electronic device, which restrictions may prohibit the installation and/or execution of a third-party diagnostic application on the mobile electronic device. Furthermore, such a method can still be applied even if the mobile electronic device has one or more broken controls, one or more broken push buttons, a broken touchscreen, and/or one or more broken sensors which may prevent a user of the mobile electronic device from navigating to, or executing, a diagnostic application and/or which may prevent a user of the mobile electronic device from inputting and/or receiving instructions from the mobile electronic device.

Repeatedly determining the status of the mobile electronic device may comprise repeatedly determining whether or not the mobile electronic device is operating in a predetermined manner.

The operation of the mobile electronic device in the predetermined manner may correspond to at least one of correct, normal, expected, default and desired operation of the mobile electronic device and/or operation of the mobile electronic device in compliance with one or more predetermined criteria.

The method may comprise reading information from the debug log stored in the ringbuffer at a plurality of different instants in time, wherein any two successive instants in time are separated by a time period which is sufficiently small so as to avoid an operating system of the mobile electronic device from over-writing any information in the debug log stored in the ringbuffer before the information can be read.

The method may comprise repeatedly reading information from the debug log at regular intervals.

The method may comprise reading at any one instant in time only such information from the debug log stored in the ringbuffer which is new or additional to the information read from the debug log at a preceding instant in time. The method may comprise identifying such information that is new or additional based on a time stamp of the corresponding entry in the debug log. The method may comprise reading the information from the debug log stored in the ringbuffer only at such instants in time when new information is added to the debug log stored in the ringbuffer. The method may comprise identifying such instants in time when new information is added to the debug log stored in the ringbuffer based on metadata of the debug log maintained by the OS of the mobile electronic device.

The method may comprise repeatedly identifying one or more entries in, or portions of, the event history which are associated with at least one of the status, the activation and/or the operation of a hardware element of the mobile electronic device.

The method may comprise repeatedly determining the status of the hardware element based on the identified one or more entries in, or portions of, the event history.

Repeatedly identifying the one or more entries in, or portions of, the event history which are associated with at least one of the status, the activation and/or the operation of the hardware element may comprise repeatedly searching the event history for at least one of one or more characters, one or more symbols, one or more keywords, and one or more commands associated with at least one of the status, the activation and/or the operation of the hardware element.

The method may comprise repeatedly parsing the identified one or more entries in, or portions of, the event history. The method may comprise repeatedly determining the status of the hardware element based on the one or more parsed entries in, or portions of, the event history.

Determining the status of the hardware element may comprise determining whether or not the hardware element is operating in a predetermined manner.

The operation of the hardware element in the predetermined manner may correspond to at least one of correct, normal, expected, default and desired operation of the hardware element and/or operation of the hardware element in compliance with one or more predetermined criteria.

The hardware element may comprise at least one of a transducer, a component, and a device.

The hardware element may comprise an input element. The hardware element may comprise output element.

The hardware element may comprise at least one of a control, a push button, a knob, a switch, a key, a keyboard, a keypad, a sensor, an accelerometer, an image sensor, a microphone, a proximity sensor, a motion sensor, a user interface and a touchscreen.

The hardware element may comprise at least one of an indicator, a display, a speaker, a user interface and a touchscreen.

The method may comprise setting, controlling or enabling the mobile electronic device so that an operating system of the mobile electronic device writes information relating to the operation of the mobile electronic device to the debug log stored in the ringbuffer of the mobile electronic device.

The method may comprise setting, controlling or enabling the mobile electronic device so as to increase a level of detail of the information relating to the operation of the mobile electronic device which the operating system of the mobile electronic device writes to the debug log stored in the ringbuffer of the mobile electronic device.

The method may comprise setting, controlling or enabling the mobile electronic device so as to cause the operating system of the mobile electronic device to perform verbose logging.

The mobile electronic device may comprise an iOS device or an iOS operating system. The method may comprise using the syslog relay service when the mobile electronic device is in normal mode.

The mobile electronic device may comprise an Android device or an Android operating system. The method may comprise enabling USB debugging.

The method may comprise using an external processing resource which is external to the mobile electronic device to repeatedly read information from the debug log stored in the ringbuffer of the mobile electronic device.

The method may comprise using the external processing resource to cause an external display which is external to the mobile electronic device to repeatedly display information representative of the determined status of the mobile electronic device.

The method may comprise using the external processing resource to cause the external display to display information for guiding or prompting a user of the mobile electronic device to perform one or more actions in relation to the mobile electronic device. The one or more actions to be performed in relation to the mobile electronic device may comprise setting, controlling or enabling the mobile electronic device or activating or operating an input element of the mobile electronic device. Further, the one or more actions to be performed in relation to the mobile electronic device may comprise setting, controlling or enabling the mobile electronic device or activating or operating an input element of the mobile electronic device so as to increase a level of detail of the information relating to the operation of the mobile electronic device.

The method may comprise repeatedly reading information from the debug log stored in the ringbuffer of the mobile electronic device after the external display has displayed the information for guiding or prompting the user to perform one or more actions in relation to the mobile electronic device. The method may comprise repeatedly using the information read from the debug log to construct and maintain an event history for the mobile electronic device. The method may comprise repeatedly determining whether the one or more actions have been performed in relation to the mobile electronic device based on the event history.

The method may comprise using the external processing resource to cause the external display to sequentially display information on the external display to sequentially guide or prompt a user of the mobile electronic device to sequentially perform a plurality of actions in relation to the mobile electronic device.

The method may comprise repeatedly reading information from the debug log stored in the ringbuffer of the mobile electronic device after the external display has displayed the information for guiding or prompting the user to perform each one of the plurality of actions in relation to the mobile electronic device. The method may comprise repeatedly using the information read from the debug log to construct and maintain an event history for the mobile electronic device. The method may comprise repeatedly determining whether each one of the plurality of actions has been performed in relation to the mobile electronic device based on the information read from the debug log.

The external processing resource and/or the external display may be part of an external computing resource such as a PC which is external to the mobile electronic device and which is configured for communication with the mobile electronic device.

The external computing resource may be configured for communication with the mobile electronic device via one or more wires or a cable such as a USB cable connected between the external computing resource and the mobile electronic device.

The mobile electronic device may comprise a mobile phone, a smartphone, a tablet or a laptop.

According to an aspect of the present disclosure there is provided a method for use in determining a status of a mobile electronic device.

The method may comprise repeatedly reading information from a debug log stored in a ringbuffer of the mobile electronic device.

The method may comprise repeatedly using the information read from the debug log to construct and maintain an event history for the mobile electronic device.

The method may comprise repeatedly determining the status of the mobile electronic device based on the event history.

According to an aspect of the present disclosure there is provided a system for use in determining a status of a mobile electronic device, the system comprising an external processing resource which is external to the mobile electronic device, wherein the external processing resource is configured for communication with the mobile electronic device and is configured to perform any of the methods described above.

According to an aspect of the present disclosure there is provided a computer program for use in determining a status of a mobile electronic device, the computer program being configured so that, when executed by an external processing resource external to the mobile electronic device, the external processing resource performs any of the methods described above.

It should be understood that any one or more of the features of any one of the preceding aspects of the present disclosure may be combined with any one or more of the features of any of the other preceding aspects of the present disclosure.

BRIEF DESCRIPTION OF THE DRAWINGS

A system, method and computer program for use in determining a status of a mobile electronic device will now be described by way of non-limiting example only with reference to the following drawings of which:

FIG. 1A is a schematic of a mobile electronic device and a system for use in determining a status of the mobile electronic device;

FIG. 1B is a schematic of the mobile electronic device and system of FIG. 1A showing internal components of the mobile electronic device and system of FIG. 1A;

DETAILED DESCRIPTION OF THE DRAWINGS

Figure 2A:
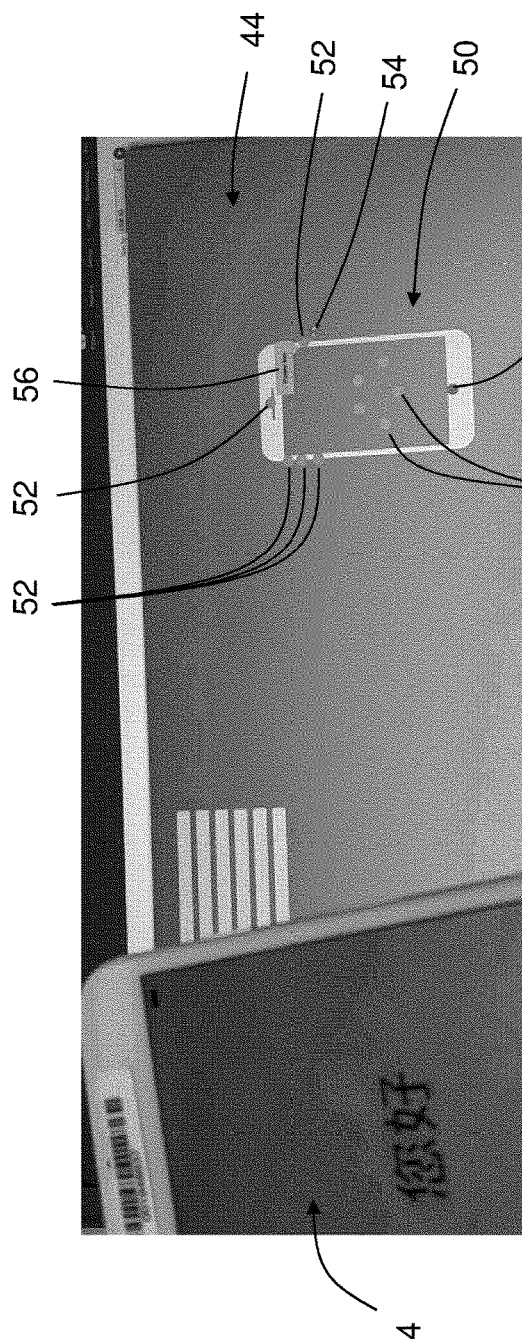
FIG. 2A shows the mobile electronic device of FIG. 1A held in front of a display of a PC displaying a graphical representation of the mobile electronic device at an instant in time before the activation of a power key of the mobile electronic device.

Referring initially to FIG. 1A, there is shown a system generally designated 2 for use in determining a status of a mobile electronic device in the form of an iPhone 4. The system 2 includes a PC 6 and a cable 8 which connects the PC 6 to the iPhone 4. The iPhone 4 includes a plurality of hardware elements in the form of a plurality of input elements and a plurality of output elements. Specifically, the iPhone 4 includes several input elements in the form of an ON/OFF button or power key 10, a home/touch ID button 12, an accelerometer 13, a volume down button 14, a volume up button 16, a silent mode switch 18, a proximity sensor 22, and a touchscreen 24. The smartphone 4 includes output elements in the form of the touchscreen 24.

As shown in FIG. 1B, the iPhone 4 further includes a processing resource in the form of a processor 30. The iPhone 4 further includes a ringbuffer 32 which stores a debug log 34. One of ordinary skill in the art will understand that, in use, the processor 30 runs an iOS operating system (OS).

The PC 6 includes a processing resource in the form of a processor 40, a memory 42 and a display 44. The memory 42 stores a computer program 46 which, when executed by the processor 40, causes the processor 40 to perform a method as described below.

In use, with the iPhone 4 configured in normal mode, the OS of the iPhone 4 repeatedly receives information relating to the status, activation and/or operation of the hardware elements 10, 12, 13, 14, 16, 18, 22, 24 and writes the received information to the debug log 34 stored in the ringbuffer 32 via the syslog relay service. As will be described in more detail below, when the iPhone 4 is connected to the PC 6 via the cable 8 and the processor 40 of the PC 6 executes the computer program 46, the processor 40 of the PC 6 repeatedly reads information from the debug log 34 stored in the ringbuffer 32 of the iPhone 4, the processor 40 repeatedly uses the information read from the debug log 34 to construct and maintain an event history for the iPhone 4, and the processor 40 repeatedly determines a status of the smartphone 4 based on the event history.

Figure 2B:
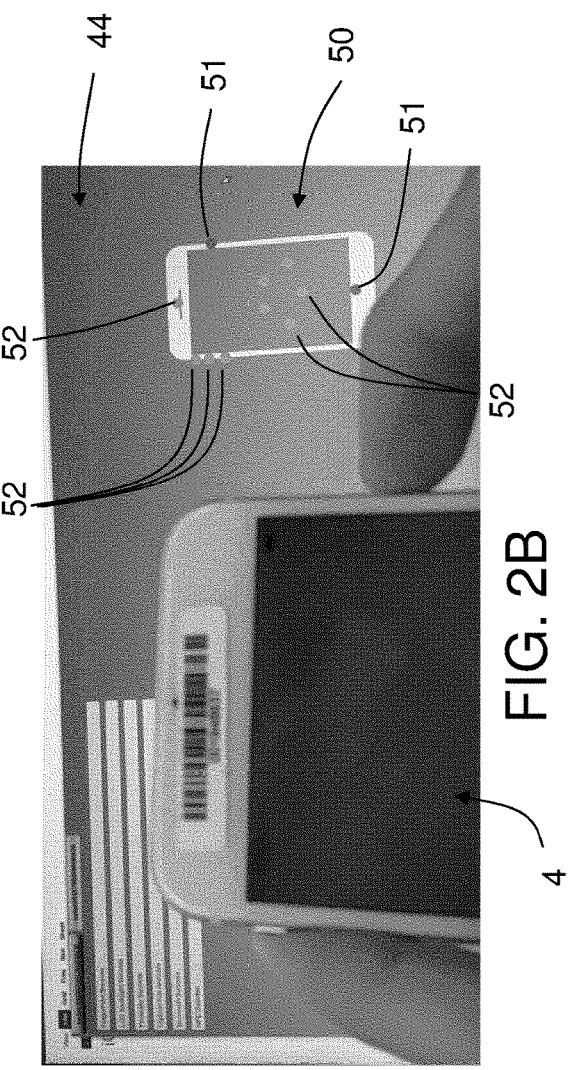
FIG. 2B shows the mobile electronic device of FIG. 1A held in front of a display of a PC displaying a graphical representation of the mobile electronic device at an instant in time after the activation of the power key of the mobile electronic device.

For example, FIG. 2A shows the iPhone 4 held in front of the display 44 of the PC 6 after activation of the home/touch ID button 12 but before activation of hardware elements 10, 13, 14, 16, 18, 22, 24 of the iPhone 4, whereas FIG. 2B shows the iPhone 4 held in front of the display 44 of the PC 6 after activation of the home/touch ID button 12 and after activation of the power key 10 of the iPhone 4 but before activation of hardware elements 13, 14, 16, 18, 22, 24. When the processor 40 of the PC 6 executes the computer program 46, the processor 40 causes the display 44 of the PC 6 to display a graphical representation 50 of the iPhone 4, which graphical representation 50 includes a graphical representation of each hardware element 10, 12, 14, 16, 18, 22, 24 by way of a corresponding coloured dot or circle. For example, as shown in FIG. 2A, the home/touch ID button 12 is graphically represented by a green coloured dot or circle 51 to signify that the home/touch ID button 12 has already been activated and/or is operating correctly and each of the other hardware elements 10, 14, 16, 18, 22, 24 is graphically represented by one or more yellow coloured dots or circles 52 to signify that the corresponding hardware element 10, 14, 16, 18, 22, 24 has not yet been activated. As shown in FIG. 2A, when a cursor 54 of the display 44 is positioned over the yellow coloured dot or circle 52 corresponding to the power key 10, the display 44 displays a text bubble 56 identifying the functionality of the power key 10 of the iPhone 4 with the words "Power key". Similarly, when the cursor 54 of the display 44 is positioned over any of the other coloured dots or circles 51, 52 corresponding to any of the other hardware elements, the display 44 displays a text bubble identifying the functionality of the corresponding hardware element.

As will be described in more detail below, when the processor 40 of the PC 6 executes the computer program 46, the processor 40 repeatedly reads information from the debug log 34 stored in the ringbuffer 32 of the iPhone 4 and determines the status of hardware elements 10, 12, 13, 14, 16, 18, 22, 24 based on the information read from the debug log 34 and updates the graphical representation 50 of the iPhone 4 displayed on the display 44 of the PC 6 accordingly. For example, if the processor 40 determines that the power key 10 of the iPhone 4 has been activated, the processor 40 causes the display 44 of the PC 6 to update the graphical representation of the power key 10 from the yellow coloured dot or circle 52 shown in FIG. 2A to a green coloured dot or circle 51 as shown in FIG. 2B to signify that the OS of the iPhone 4 has detected activation of the power key 10 and that the power key 10 is therefore functioning correctly.

More specifically, when the processor 40 of the PC 6 executes the computer program 46, the processor 40 repeatedly reads information from the debug log 34 stored in the ringbuffer 32 of the iPhone 4 at a plurality of different instants in time, wherein any two successive instants in time are separated by a time period which is sufficiently small so as to avoid the OS of the iPhone 4 from over-writing any information in the debug log 34 stored in the ringbuffer 32 before the processor 40 can read the information. Specifically, when the processor 40 of the PC 6 executes the computer program 46, the processor 40 obtains the contents of the debug log 34 stored in the ringbuffer 32 of the iPhone 4 by executing an "idevicesyslog" command. The processor 40 reads only the information from the debug log 34 stored in the ringbuffer 32 at one instant in time which is new or additional to the information which the processor 40 reads from the debug log 34 at a preceding instant in time. By proceeding in this way, there is no need for the processor 40 to repeatedly read the whole debug log 34 at each instant in time. The processor 40 uses the information which is repeatedly read from the debug log 34 to construct and maintain an event history for the iPhone 4 which includes an event history of each of the hardware elements 10, 12, 13, 14, 16, 18, 22, 24. The event history for the iPhone 4 may also include any errors or warnings which the OS of the iPhone 4 has encountered or generated during execution of the computer program 46.

The processor 40 repeatedly searches the event history to identify any entries in, portions of, or lines of code of, the event history which contain one or more characters, one or more symbols, one or more keywords, or one or more commands associated with at least one of the status, the activation and/or the operation of each hardware element 10, 12, 13, 14, 16, 18, 22, 24. For example, the processor 40 repeatedly executes a "grep" command for each of the hardware elements 10, 12, 13, 14, 16, 18, 22, 24 of the iPhone 4 to repeatedly search the event history and identify any entries in, portions of, or lines of code of, the event history which contain one or more characters, one or more symbols, one or more keywords, or one or more commands associated with at least one of the status, the activation and/or the operation of each hardware element 10, 12, 13, 14, 16, 18, 22, 24. The processor 40 repeatedly determines the status of each hardware element 10, 12, 13, 14, 16, 18, 22, 24 from the corresponding entries in, portions of, or lines of code of, the event history identified during the search. For example, the processor 40 repeatedly determines the status of each hardware element 10, 12, 13, 14, 16, 18, 22, 24 by repeatedly parsing the corresponding lines of code of the event history identified during the search. The processor 40 causes the display 44 of the PC 6 to repeatedly update the graphical representation 50 of the iPhone 4 including the graphical representations of each hardware element 10, 12, 13, 14, 16, 18, 22, 24 according to the determined status of each hardware element 10, 12, 13, 14, 16, 18, 22, 24. At the instant in time corresponding to FIG. 2B, the only hardware element 10, 12, 13, 14, 16, 18, 22, 24 which has changed status relative to the instant time corresponding to FIG. 2A is the power key 10 and the processor 40 causes the display 44 of the PC 6 to update the graphical representation of the power key 10 from the yellow coloured dot or circle 52 shown in FIG. 2A to the green coloured dot or circle 51 shown in FIG. 2B to signify that the OS of the iPhone 4 has detected activation of the power key 10 and that the power key 10 is therefore functioning correctly.

Figure 3A:
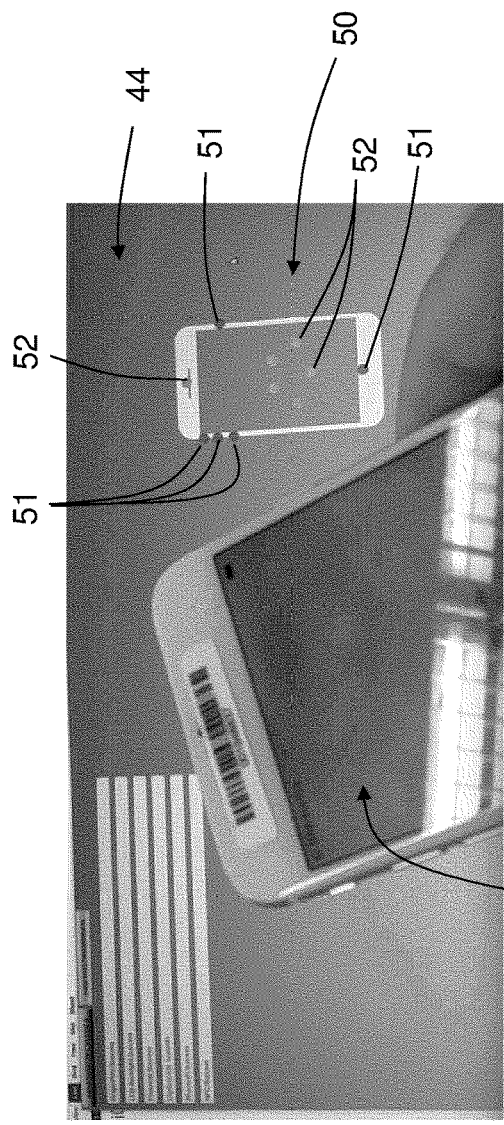
FIG. 3A shows the mobile electronic device of FIG. 1A held in front of a display of a PC displaying a graphical representation of the mobile electronic device at an instant in time before the activation of a proximity sensor of the mobile electronic device.
Figure 3B:
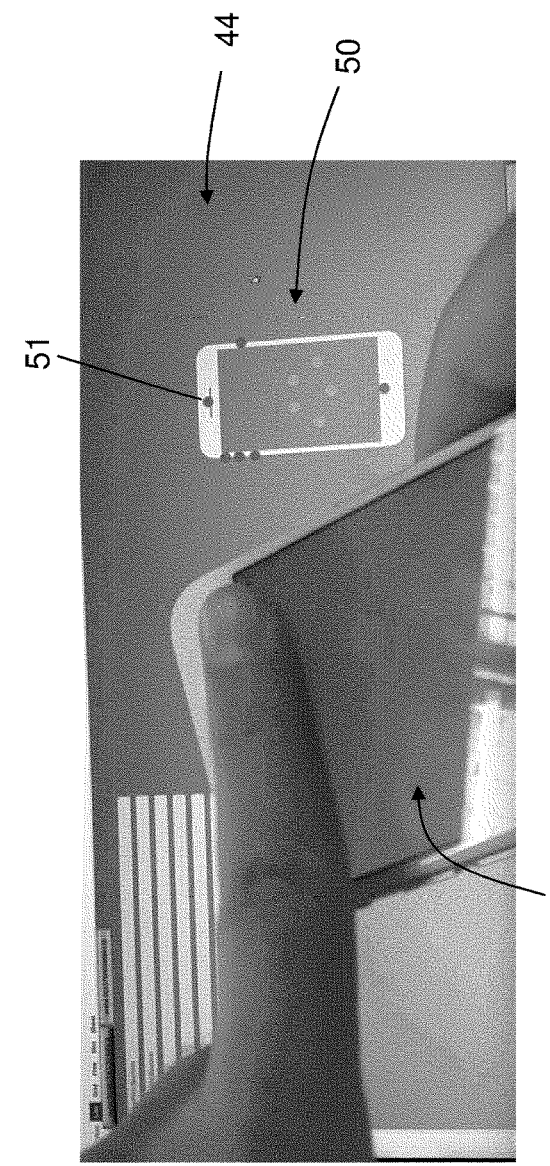
FIG. 3B shows the mobile electronic device of FIG. 1A held in front of a display of a PC displaying a graphical representation of the mobile electronic device at an instant in time after the activation of the proximity sensor of the mobile electronic device.

Referring now to FIG. 3A, the iPhone 4 is shown held in front of the display 44 of the PC 6 after activation of the home/touch ID button 12, the power key 10, the volume down button 14, the volume up button 16, and the silent mode switch 18 but before activation of the proximity sensor 22 and the touchscreen 24 of the iPhone 4, whereas FIG. 3B shows the iPhone 4 held in front of the display 44 of the PC 6 after activation of the home/touch ID button 12, the power key 10, the volume down button 14, the volume up button 16, the silent mode switch 18 and the proximity sensor 22, but before activation of the touchscreen 24. As shown in FIG. 3A, each of the home/touch ID button 12, the power key 10, the volume down button 14, the volume up button 16, and the silent mode switch 18 is graphically represented by a corresponding green coloured dot or circle 51 to signify that these hardware elements have already been activated, whereas the proximity sensor 22 is graphically represented by a yellow coloured dot or circle 52 to signify that the proximity sensor 22 has not yet been activated. Similarly, the touchscreen 24 is graphically represented by a group of yellow coloured dots or circles 52 to signify that the corresponding regions of the touchscreen 24 have not yet been activated.

When the processor 40 of the PC 6 executes the computer program 46, the processor 40 repeatedly reads information from the debug log 34 stored in the ringbuffer 32 of the iPhone 4. The processor 40 uses the information read from the debug log 34 to construct and maintain an event history for the iPhone 4. The processor 40 determines the status of hardware elements 10, 12, 13, 14, 16, 18, 22, 24 based on the event history and updates the graphical representation 50 of the iPhone 4 displayed on the display 44 of the PC 6 accordingly. For example, if the processor 40 determines that the proximity sensor 22 of the iPhone 4 has been activated, the processor 40 causes the display 44 of the PC 6 to update the graphical representation of the proximity sensor 22 from the yellow coloured dot or circle 52 shown in FIG. 3A to a green coloured dot or circle 51 as shown in FIG. 3B to signify that the OS of the iPhone 4 has detected activation of the proximity sensor 22 and that the proximity sensor 22 is therefore functioning correctly. One of skill in the art will understand that the processor 40 determines that the proximity sensor 22 of the iPhone 4 has been activated based on the event history in the same way that the processor 40 determines that the power key 10 of the iPhone 4 has been activated based on the event history as described above with reference to FIGS. 2A and 2B.

Figure 4A:
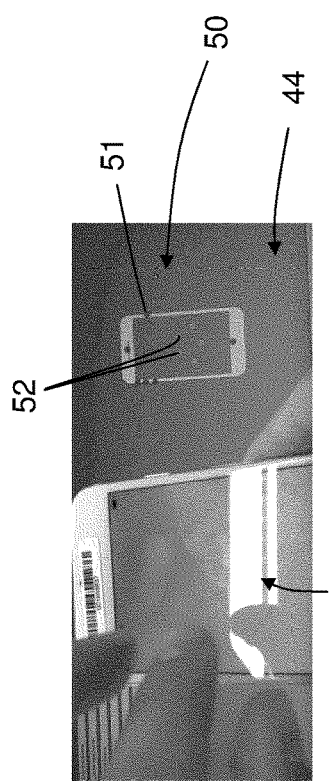
FIG. 4A shows the mobile electronic device of FIG. 1A held in front of a display of a PC displaying a graphical representation of the mobile electronic device at an instant in time before the activation of a touchscreen of the mobile electronic device.
Figure 4B:
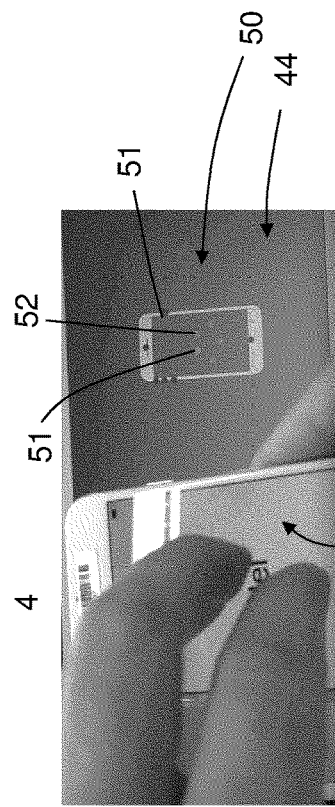
FIG. 4B shows the mobile electronic device of FIG. 1A held in front of a display of a PC displaying a graphical representation of the mobile electronic device at an instant in time after the activation of one region of the touchscreen of the mobile electronic device.
Figure 4C:
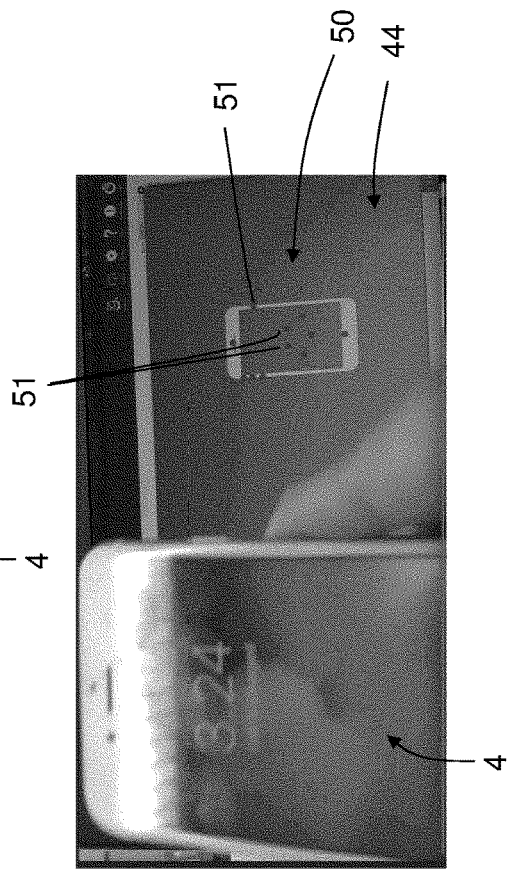
FIG. 4C shows the mobile electronic device of FIG. 1A held in front of a display of a PC displaying a graphical representation of the mobile electronic device at an instant in time after the activation of five different regions of the touchscreen of the mobile electronic device.

Similarly, FIGS. 4A, 4B and 4C illustrate the sequential activation of different regions of the touchscreen 24 of the iPhone 4, the detection of the activation of the different regions of the touchscreen 24 by the processor 40 of the PC 6, and how the processor 40 updates the graphical representation 50 of the iPhone 4 on the display 44 of the PC 6 to show the live status of hardware elements 10, 12, 13, 14, 16, 18, 22, 24 of the iPhone 4 on the display 44 of the PC 6. One of skill in the art will understand that the processor 40 determines that the different regions of the touchscreen 24 of the iPhone 4 have been activated based on the event history in the same way that the processor 40 determines that the power key 10 of the iPhone 4 has been activated based on the event history as described above with reference to FIGS. 2A and 2B.

Figure 5A:
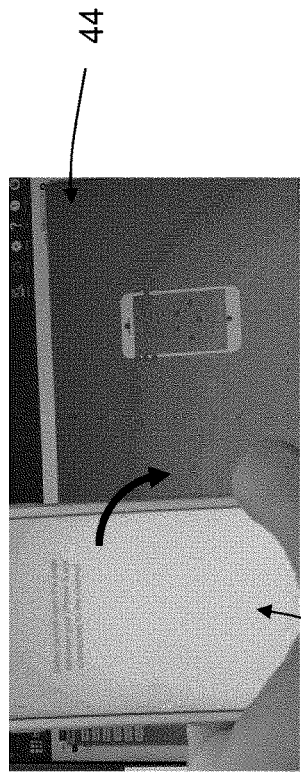
FIG. 5A shows the mobile electronic device of FIG. 1A held in front of a display of a PC displaying a graphical representation of the mobile electronic device at an instant in time before rotation of the mobile electronic device from a portrait orientation to a landscape orientation.
Figure 5B:
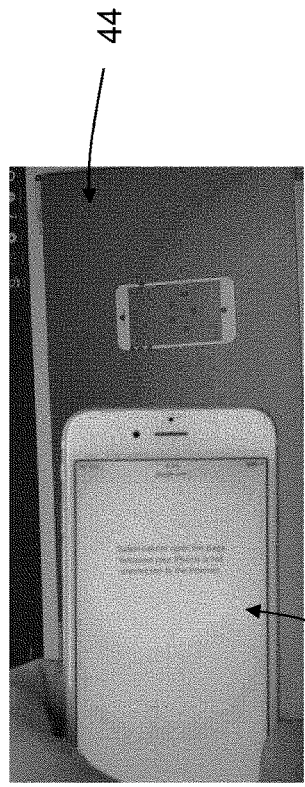
FIG. 5B shows the mobile electronic device of FIG. 1A held in front of a display of a PC displaying a graphical representation of the mobile electronic device at an instant in time just after rotation of the mobile electronic device from a portrait orientation to a landscape orientation.
Figure 5C:
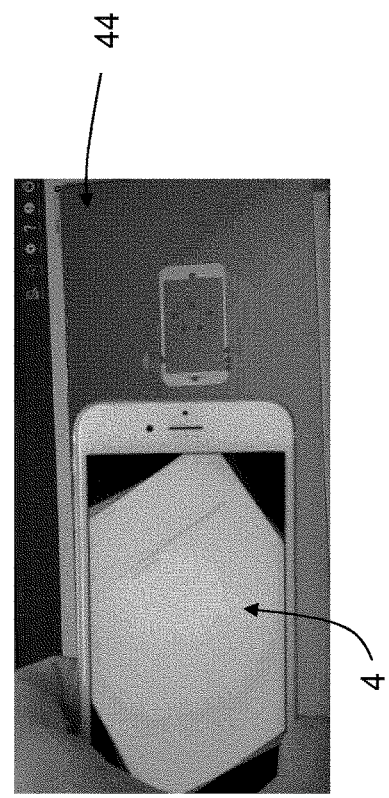
FIG. 5C shows the mobile electronic device of FIG. 1A held in front of a display of a PC displaying a graphical representation of the mobile electronic device at an instant in time just after the instant in time corresponding to FIG. 5B but before completion of the re-orientation of the image displayed on a touchscreen of the mobile electronic device from portrait to landscape.

FIGS. 5A, 5B and 5C illustrate the activation of the accelerometer 13 of the iPhone 4 by rotating the iPhone 4 though approximately 90° from a "portrait orientation" to a "landscape orientation", the detection of the activation of the accelerometer 13 by the processor 40 of the PC 6, and how the processor 40 updates the graphical representation 50 of the iPhone 4 on the display 44 of the PC 6 to show the live status of hardware elements 10, 12, 14, 16, 18, 22, 24 of the iPhone 4 on the display 44 of the PC 6 together with the live orientation of the iPhone 4 on the display 44 of the PC 6. FIG. 5A shows the iPhone 4 and the graphical representation 50 of the iPhone 4 on the display 44 of the PC 6 after hardware elements 10, 12, 14, 16, 18, 22, 24 of the iPhone 4 have been activated with the iPhone 4 in a "portrait orientation". FIG. 5B shows the iPhone 4 and the graphical representation 50 of the iPhone 4 on the display 44 of the PC 6 after hardware elements 10, 12, 14, 16, 18, 22, 24 of the iPhone 4 have been activated but just after the iPhone 4 has been oriented in a "landscape orientation". At the instant of time corresponding to FIG. 5B, the processor 40 of the PC 6 has not yet had sufficient time to update the graphical representation 50 of the iPhone 4 on the display 44 of the PC 6. FIG. 5C shows the iPhone 4 and the graphical representation 50 of the iPhone 4 on the display 44 of the PC 6 at an instant in time just after the instant in time corresponding to FIG. 5B and after the hardware elements 10, 12, 14, 16, 18, 22, 24 of the iPhone 4 have been activated, after the iPhone 4 has been oriented in a "landscape orientation" and after the graphical representation 50 of the iPhone 4 on the display 44 of the PC 6 has been updated, but before completion of the re-orientation of the image displayed on the touchscreen 24 of the iPhone 4 from "portrait" to "landscape". One of skill in the art will understand that the processor 40 determines that the accelerometer 13 of the iPhone 4 has detected the re-orientation of the iPhone 4 from the "portrait orientation" to the "landscape orientation" based on the information read from the debug log 34 in essentially the same way that the processor 40 determines that the power key 10 of the iPhone 4 has been activated based on the event history as described above with reference to FIGS. 2A and 2B. Moreover, as may be appreciated from FIG. 5C, the processor 40 determines that the accelerometer 13 of the iPhone 4 has detected the re-orientation of the iPhone 4 from the "portrait orientation" to the "landscape orientation" and updates the graphical representation 50 of the iPhone 4 on the display 44 of the PC 6 so fast that the iPhone 4 does not even have time to complete the re-orientation of the image displayed on the touchscreen 24 of the iPhone 4 from "portrait" to "landscape", thereby illustrating the real-time nature of the method of determining the status of the iPhone 4.

Although not described above, one of ordinary skill in the art will understand that when the program 46 is executed by the processor 40, the processor 40 may detect the status, activation and/or operation of any of the hardware elements 10, 12, 13, 14, 16, 18, 22, 24 and update the graphical representation 50 of the iPhone 4 on the display 44 of the PC 6 accordingly using a method which is essentially identical to the methods described above with reference to FIGS. 2A-5C.

In this way, the processor 40 may determine whether or not any of the hardware elements 10, 12, 13, 14, 16, 18, 22, 24 are operating in a predetermined manner. For example, the processor 40 may determine whether or not any of the hardware elements 10, 12, 13, 14, 16, 18, 22, 24 are operating in a predetermined manner which corresponds to at least one of correct, normal, expected, default and desired operation of the hardware element and/or operation of the hardware element in compliance with one or more predetermined criteria. Such methods may be useful for diagnosing faults or problems with any of the hardware elements 10, 12, 13, 14, 16, 18, 22, 24.

The processor 40 may determine whether or not the iPhone 4 is operating in a predetermined manner. For example, the processor 40 may determine whether or not the iPhone 4 is operating in a predetermined manner which corresponds to at least one of correct, normal, expected, default and desired operation of the iPhone 4 and/or operation of the iPhone 4 in compliance with one or more predetermined criteria. Such methods may be useful for diagnosing faults or problems with the iPhone 4.

It should be understood that the methods for use in determining the status of the iPhone 4 described above with reference to FIGS. 2A-5C do not require the installation and/or execution of a diagnostic application on the iPhone 4 and can therefore be used even when it is not technically possible to install and/or execute a diagnostic application on the iPhone 4 e.g. as a consequence of lack of memory available on the iPhone 4. The methods described above may avoid any requirement to receive information indirectly from the OS of the mobile electronic device via the APIs of the OS. Additionally or alternatively, the methods described above may avoid any restrictions imposed by the manufacturer of the iPhone 4 and/or a manufacturer of the OS of the iPhone 4, which restrictions may prohibit the installation and/or execution of a third-party diagnostic application on the iPhone 4. Furthermore, the methods described above can still be applied even if the iPhone 4 has one or more broken controls, one or more broken push buttons, a broken touchscreen, and/or one or more broken sensors which may prevent a user of the iPhone 4 from navigating to, or executing, a diagnostic application and/or which may prevent a user of the iPhone 4 from inputting and/or receiving instructions from the iPhone 4.

In a variant of the method for use in determining the status of the iPhone 4 described above with reference to FIGS. 2A-5C, the processor 40 may cause the display 44 of the PC 6 to display information for guiding or prompting a user of the iPhone 4 to perform one or more actions in relation to the iPhone 4. For example, the processor 40 may cause the display 44 of the PC 6 to display information for guiding or prompting a user of the iPhone 4 to activate or operate an input element of the iPhone 4. The method may comprise repeatedly reading information from the debug log 34 stored in the ringbuffer 32 of the iPhone 4 after the display 44 of the PC 6 has displayed the information for guiding or prompting the user to perform one or more actions in relation to the iPhone 4. The method may comprise using the information read from the debug log 34 to construct and maintain an event history for the iPhone 4. The method may comprise determining whether the one or more actions have been performed in relation to the iPhone 4 based on the event history.

The processor 40 may cause the display 44 of the PC 6 to sequentially display information which sequentially guides or prompts a user of the iPhone 4 to sequentially perform a plurality of actions in relation to the iPhone 4. The method may comprise repeatedly reading the information from the debug log 34 stored in the ringbuffer 32 of the iPhone 4 after the display 44 of the PC 6 has displayed the information for guiding or prompting the user to perform each one of the plurality of actions in relation to the iPhone 4. The method may comprise determining whether each one of the plurality of actions has been performed in relation to the iPhone 4 based on the event history.

One of ordinary skill in the art will understand that various modifications are possible to the system and methods described above. For example, although the foregoing methods are described in the context of an iPhone, it should be understood that the same methods may be applied to a mobile electronic device of any kind, for example to other types, kinds or makes of mobile phone or smartphone, to a tablet and/or to a laptop. In particular, it should be understood that the same methods may be applied to a mobile electronic device running an operating system other than an iOS operating system. For example, the same methods may be applied to a mobile electronic device running an Android operating system.

The method may comprise setting, controlling or enabling the mobile electronic device so as to increase a level of detail of the information relating to the operation of the mobile electronic device which the operating system of the mobile electronic device writes to the debug log stored in the ringbuffer of the mobile electronic device.

The method may comprise setting, controlling or enabling the mobile electronic device so as to cause the operating system of the mobile electronic device to perform verbose logging.

The mobile electronic device may comprise an iOS device or an iOS operating system. The method may comprise using the syslog relay service when the mobile electronic device is in normal mode.

The mobile electronic device may comprise an Android device or an Android operating system. The method may comprise enabling USB debugging.

The mobile electronic device may comprise more or fewer hardware elements than the hardware elements described above. For example, the mobile electronic device may comprise at least one of a microphone, an image sensor and a speaker.

One of ordinary skill in the art will understand that one or more of the features of the embodiments of the present disclosure described above with reference to the drawings may produce effects or provide advantages when used in isolation from one or more of the other features of the embodiments of the present disclosure and that different combinations of the features are possible other than the specific combinations of the features of the embodiments of the present disclosure described above.

The invention claimed is:

1. A method for use in determining a status of a mobile electronic device, the method comprising:
    repeatedly reading information from a debug log stored in a ringbuffer of the mobile electronic device;
    repeatedly using the information read from the debug log to construct and maintain an event history for the mobile electronic device;
    repeatedly determining the status of the mobile electronic device based on the event history;
    repeatedly identifying one or more entries in, or portions of, the event history which are associated with at least one of the status, the activation and/or the operation of a hardware element of the mobile electronic device;
    repeatedly determining the status of the hardware element based on the identified one or more entries in, or portions of, the event history;
    repeatedly parsing the identified one or more entries in, or portions of, the event history; and
    repeatedly determining the status of the hardware element based on the one or more parsed entries in, or portions of, the event history.

2. The method of claim 1, wherein repeatedly determining the status of the mobile electronic device comprises repeatedly determining whether or not the mobile electronic device is operating in a predetermined manner.

3. The method of claim 2, wherein the operation of the mobile electronic device in the predetermined manner corresponds to at least one of correct, normal, expected, default and desired operation of the mobile electronic device and/or operation of the mobile electronic device in compliance with one or more predetermined criteria.

4. The method of claim 1, further comprising reading information from the debug log stored in the ringbuffer at a plurality of different instants in time, wherein any two successive instants in time are separated by a time period which is sufficiently small so as to avoid an operating system of the mobile electronic device from over-writing any information in the debug log stored in the ringbuffer before the information can be read.

5. The method of claim 1, further comprising repeatedly reading information from the debug log at regular intervals.

6. The method of claim 1, further comprising reading only information from the debug log stored in the ringbuffer at one instant in time which is new or additional to the information read from the debug log at a preceding instant in time.

7. The method of claim 1, wherein repeatedly identifying the one or more entries in, or portions of, the event history which are associated with at least one of the status, the activation and/or the operation of the hardware element comprises repeatedly searching the event history for at least one of one or more characters, one or more symbols, one or more keywords, and one or more commands associated with at least one of the status, the activation and/or the operation of the hardware element.

8. The method of claim 1, wherein determining the status of the hardware element comprises determining whether or not the hardware element is operating in a predetermined manner.

9. The method of claim 8, wherein the operation of the hardware element in the predetermined manner corresponds to at least one of correct, normal, expected, default and desired operation of the hardware element and/or operation of the hardware element in compliance with one or more predetermined criteria.

10. The method of claim 1, wherein the hardware element comprises at least one of: a transducer, a component, a device, an input element, an output element, a control, a push button, a knob, a switch, a key, a keyboard, a keypad, a sensor, an accelerometer, an image sensor, a microphone, a proximity sensor, a motion sensor, a user interface, a touchscreen, an indicator, a display, and a speaker.

11. The method of claim 1, further comprising setting, controlling or enabling the mobile electronic device so that an operating system of the mobile electronic device writes information relating to the operation of the mobile electronic device to the debug log stored in the ringbuffer of the mobile electronic device.

12. The method of claim 1, further comprising:
setting, controlling or enabling the mobile electronic device so as to increase a level of detail of the information relating to the operation of the mobile electronic device which the operating system of the mobile electronic device writes to the debug log stored in the ringbuffer of the mobile electronic device; and/or
setting, controlling or enabling the mobile electronic device so as to cause the operating system of the mobile electronic device to perform verbose logging.

13. The method of claim 1, wherein the mobile electronic device comprises an iOS device or an iOS operating system and the method comprises using the syslog relay service when the mobile electronic device is in normal mode.

14. The method of claim 1, wherein the mobile electronic device comprises an Android device or an Android operating system and the method comprises enabling USB debugging.

15. The method of claim 1, further comprising using an external processing resource which is external to the mobile electronic device to repeatedly read information from the debug log stored in the ringbuffer of the mobile electronic device.

16. The method of claim 15, further comprising using the external processing resource to cause an external display which is external to the mobile electronic device to repeatedly display information representative of the determined status of the mobile electronic device.

17. The method of claim 16, further comprising using the external processing resource to cause the external display to display information for guiding or prompting a user of the mobile electronic device to perform one or more actions in relation to the mobile electronic device, for example wherein the one or more actions to be performed in relation to the mobile electronic device comprise activating or operating an input element of the mobile electronic device.

18. The method of claim 16, further comprising:
repeatedly reading information from the debug log stored in the ringbuffer of the mobile electronic device after the external display has displayed the information for guiding or prompting the user to perform one or more actions in relation to the mobile electronic device;
repeatedly using the information read from the debug log to construct and maintain an event history for the mobile electronic device; and
repeatedly determining whether the one or more actions have been performed in relation to the mobile electronic device based on the event history.

19. The method of claim 16, further comprising using the external processing resource to cause the external display to sequentially display information on the external display to sequentially guide or prompt a user of the mobile electronic device to sequentially perform a plurality of actions in relation to the mobile electronic device.

20. The method of claim 19, further comprising:
repeatedly reading information from the debug log stored in the ringbuffer of the mobile electronic device after the external display has displayed the information for guiding or prompting the user to perform each one of the plurality of actions in relation to the mobile electronic device;
repeatedly using the information read from the debug log to construct and maintain an event history for the mobile electronic device; and
repeatedly determining whether each one of the plurality of actions has been performed in relation to the mobile electronic device based on the information read from the debug log.

21. The method of claim 1, wherein the mobile electronic device comprises a mobile phone, a smartphone, a tablet or a laptop.

22. A system for use in determining a status of a mobile electronic device, the system comprising an external processing resource which is external to the mobile electronic device, wherein the external processing resource is configured for communication with the mobile electronic device and is configured to perform the method of claim 1.

23. A non-transitory computer-readable medium comprising a computer program for use in determining a status of a mobile electronic device, the computer program being configured so that, when executed by an external processing resource external to the mobile electronic device, the external processing resource performs the method of claim 1.

24. A method for use in determining a status of a mobile electronic device, the method comprising:
repeatedly reading information from a debug log stored in a ringbuffer of the mobile electronic device;
repeatedly using the information read from the debug log to construct and maintain an event history for the mobile electronic device;
repeatedly determining the status of the mobile electronic device based on the event history;
repeatedly identifying one or more entries in, or portions of, the event history which are associated with at least one of the status, the activation and/or the operation of a hardware element of the mobile electronic device;
repeatedly determining the status of the hardware element based on the identified one or more entries in, or portions of, the event history; and wherein repeatedly identifying the one or more entries in, or portions of, the event history which are associated with at least one of the status, the activation and/or the operation of the hardware element comprises repeatedly searching the event history for at least one of one or more characters, one or more symbols, one or more keywords, and one or more commands associated with at least one of the status, the activation and/or the operation of the hardware element.

25. A method for use in determining a status of a mobile electronic device, the method comprising:

repeatedly reading information from a debug log stored in a ringbuffer of the mobile electronic device;

repeatedly using the information read from the debug log to construct and maintain an event history for the mobile electronic device;

repeatedly determining the status of the mobile electronic device based on the event history;

using an external processing resource which is external to the mobile electronic device to repeatedly read information from the debug log stored in the ringbuffer of the mobile electronic device and cause an external display which is external to the mobile electronic device to repeatedly display information representative of the determined status of the mobile electronic device;

repeatedly reading information from the debug log stored in the ringbuffer of the mobile electronic device after the external display has displayed the information for guiding or prompting the user to perform one or more actions in relation to the mobile electronic device;

repeatedly using the information read from the debug log to construct and maintain an event history for the mobile electronic device; and repeatedly determining whether the one or more actions have been performed in relation to the mobile electronic device based on the event history.

* * * * *